United States Patent [19]

Grosberg

[11] 4,447,962

[45] May 15, 1984

[54] ADJUSTABLE BORE TARGET AND GAGE

[75] Inventor: Joseph J. Grosberg, Oxford, Conn.

[73] Assignee: USM Corporation, Farmington, Conn.

[21] Appl. No.: 381,357

[22] Filed: May 24, 1982

[51] Int. Cl.³ .............................................. G01C 15/00
[52] U.S. Cl. ....................................... 33/286; 33/412; 33/277; 33/298
[58] Field of Search ................ 33/286, 277, 278, 279, 33/298, 147 K, 149 R, 174 M, 174 P, 174 Q, 178 R, 178 F, 180 R, 412, 280, 148 H, 149 J, 141, 141.5, 172 B, 172 D

[56] References Cited

U.S. PATENT DOCUMENTS

| | | | |
|---|---|---|---|
| 1,403,156 | 1/1922 | Gonzales | 33/174 Q |
| 2,542,030 | 2/1951 | Hoppe | 33/178 R |
| 2,958,951 | 11/1960 | Altson | 33/178 R |
| 3,599,336 | 8/1971 | Walsh | 33/286 |

Primary Examiner—Willis Little
Attorney, Agent, or Firm—Vincent A. White

[57] ABSTRACT

A device having four engagement points movable along a bore and provided with an optical target or gage adjustable in cross directions normal to the bore axis and a probe mounted for rotation on the gage and engageable with the cylindrical surface of the bore for determining concentricity of the gage and the bore axis.

7 Claims, 4 Drawing Figures

ADJUSTABLE BORE TARGET AND GAGE

FIELD OF THE INVENTION

This invention relates to an adjustable device for aligning an optical target and/or bore measuring device with the axis of a large bore for aligning the axis of the bore with other mating apparatus or machine tools or for gaging the surface of the bore.

DESCRIPTION OF THE PRIOR ART

There is shown in U.S. Pat. No. 3,169,323 roll calipers having a cradle adapted to rest on the cylindrical surface of rolls. Bars extending downwardly and outwardly from the cradle are each provided with adjustable slides straddling the roll to gage its outside diameter. There is shown in a catalogue of Mitatoyo Manufacturing Co. Ltd. of Japan a device including a bed rollable axially in large bores for measuring internal diameters. One spring pressed leg holds the bed against the bore surface and a lever mounted sensing roll under the bed also engages the bore surface to sense the bore diameter. An optical target previously available has three outwardly adjustable legs for centering a target by trial and error. It is a problem in the alignment and measurement of large bores which are machined to close tolerances to provide a simple device which is easily adjusted to the diameter of large bores to center an optical target with the bore axis and which is movable along the bore to gage the bore at different axial locations without changing the target and axis alignment. The gage of the U.S. Pat. No. 3,169,323 is of course not suitable to fit within a bore or to carry a target. The three legged device while suitable, is difficult to adjust and like the Japanese device has no provision at all for aligning a gage or an optical target with the axis of a bore.

Accordingly, it is an object of the invention to provide a device which is easily and precisely adjusted to align a bore measuring device or optical target with the axis of a large bore.

SUMMARY OF THE INVENTION

The invention provides a carriage with four engagement points adapted to move along the cylindrical surface of a bore while maintaining a gage or optical target in a predetermined relation to the bore axis.

According to one feature, the carriage is provided with spherical rolls at the four engagement points and has a gage adjustably mounted thereon for alignment with the bore axis. According to another feature the adjustable mounting for the gage comprises two cross slide stages which are adjustable relative to the carriage by micrometer type screw adjustments. One of the stages holds the gage or target.

According to a further feature the gage includes a probe engageable with the bore surface and rotatable about the circumference of the bore surface on an axis to determine alignment of the gage axis with the bore axis. The gage axis is coaxial with the center of the optical target and by adjusting the slide stages the gage, target and bore axes may be precisely aligned. As long as the bore diameter is constant, the entire unit may be rolled along the bore without changing the coaxial relation of the gage, target and bore.

DESCRIPTION OF THE PREFERRED EMBODIMENT

Figure 1:
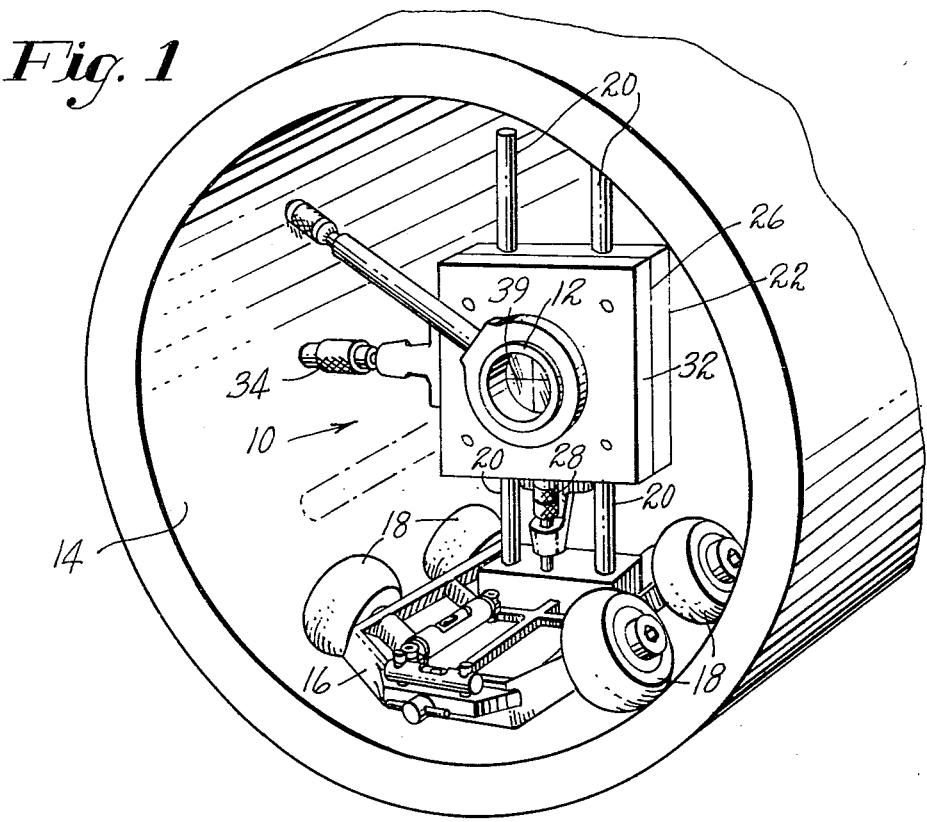
FIG. 1 is a perspective view showing the gaging apparatus of the invention in operating position in a large bore to be gaged.
Figure 2:
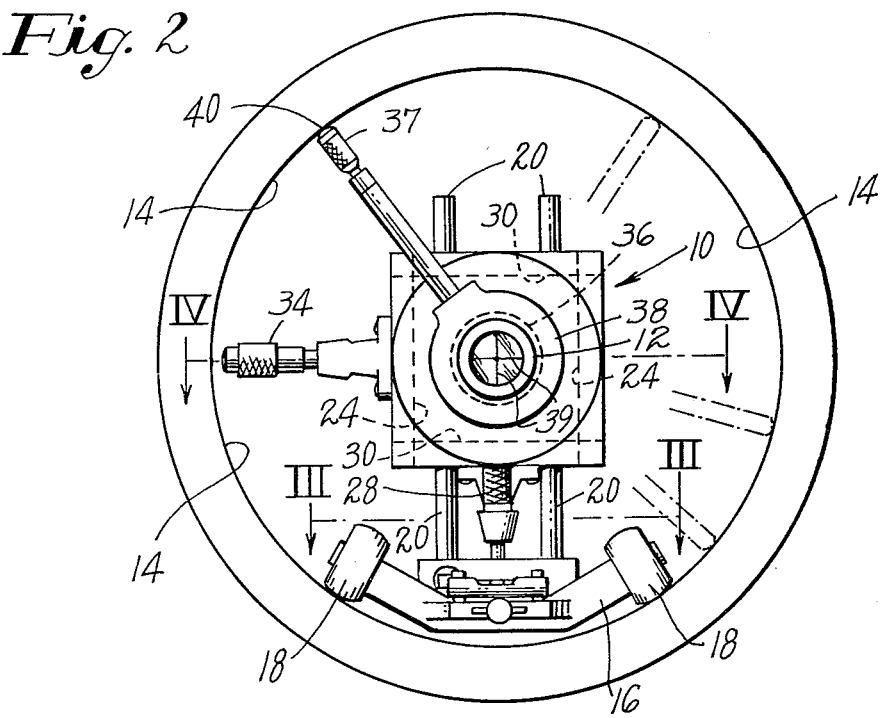
FIG. 2 is an end elevation of the assembly shown in FIG. 1.
Figure 3:
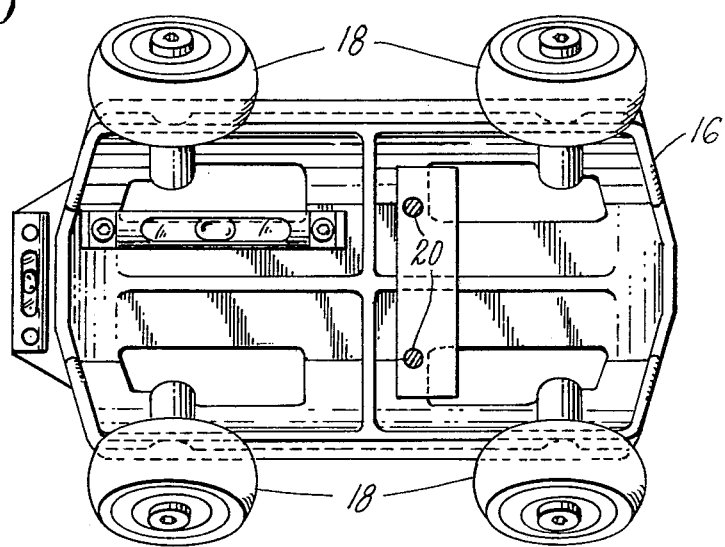
FIG. 3 is a section substantially on line III—III of FIG. 2.

Referring to FIGS. 1 and 2 there is shown a gaging device 10 having an optical target 12 which is adjustable for alignment with the longitudinal axis of an elongate bore 14 such for example as for the barrel of a plastics processing machine or the like. The device is supported on a carriage 16 having spherical rolls 18 rotatably mounted thereon for rolling along the cylindrical surface of the bore 14. The arrangement is such that engagement of the rolls at four points of contact with the cylindrical bore surface maintains the device in parallel relation to the bore axis in any location along the bore.

Figure 4:
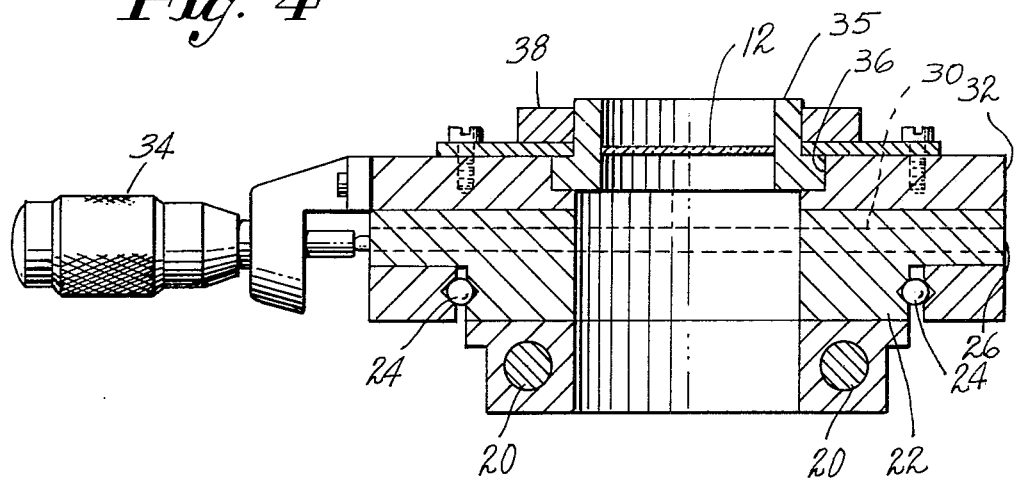
FIG. 4 is a section substantially on line IV—IV of FIG. 2.

The carriage 16 has at least one but preferably two upstanding parallel rods 20 on which is mounted a bracket 22 having ways 24 (see also FIG. 4) along which a stage plate 26 is mounted to move in vertical directions as seen in FIGS. 1 and 2. A micrometer screw adjusting means 28 carried by the bracket 22 may be used to adjust the stage plate 26 along the ways 24. The stage plate 26 is provided with parallel ways 30 along which a second stage plate 32 is mounted for cross movement in horizontal directions. A micrometer screw adjusting means 34 may be used to adjust the second stage plate along ways 30. The second stage plate is provided with a circular aperture 36 which receives the target 12 in a holder 31. While the ways are shown as being opposed V-grooves which receive preloaded balls for precise alignment, it should be obvious that a wide variety of ways such as T-slot ways and simple tongue and groove ways could be substituted without departing from the scope of the invention. Furthermore, any simple adjustable means for moving cross stage plates 26 and 32 could be substituted for the fine micrometer screw adjustments illustrated.

Referring particularly to FIGS. 1 and 2, a probe 37 extending radially from a collar 38 (see also FIG. 4) mounted for rotation on a portion of the target holder 35 on an axis coaxial with the cross hairs 39. The probe 37 is adjustable radially outward until the tip 40 engages the surface of the bore 14. The tip 40 is yieldable on the probe 37 and is rotated around the surface of the bore. The adjusting screws 28 and 34 are rotated to move the stage plates 26 and 32 until no yielding movement of the tip relative to the probe occurs when the probe is rotated around the bore surface by means of the collar 38 rotating on the target 12. In this manner the cross hairs 39 are precisely aligned with the bore axis. The tip and probe may be provided with appropriate indicia to indicate the extent of yield of the tip as it is rotated about the bore so that the micrometer adjustments may be moved similar amounts to center the axis of probe rotation with the bore axis.

By sighting through the optical target the axis of the bore may be aligned with a center such as about which the bore may be aligned with a center of rotation of a mating apparatus or of a machine tool for machining the bore. By moving the gage 10 along the bore to the opposite end of the bore or other appropriate location and subsequent sightings through the optical target the parallelism of the bore axis with the desired center line is assured. It should also be understood that transducer means may be provided on the probe 37 to indicate through suitable electric or electronic circuits the size or concentricity or eccentricity of various portions of the bore as the carriage is moved along the bore and the probe is rotated in the bore. To this end, a typical signal transducer means and signal gage converting circuits which may be used are described in U.S. Pat. No. 3,169,323 which is incorporated herein by reference. While the device described in that patent is directed to caliper means for measuring the outside diameter of a roll the transducer means and signal converting circuits are equally applicable to measurement of bores.

While a preferred embodiment of the invention has been shown and described it is to be understood that the invention is not limited to the specific details shown since the invention is capable of modification and variation within the scope of the invention as defined in the appended claims. For example, it should be apparent that the four locating points for the carriage in the form of the rolls 18 could also be solid, pointed or rounded areas. Also the micrometer adjustments 28, 34 could take other forms suitable to adjust the cross stages of the gage without departing from the scope of the claimed invention. Clearly, the probe 37 may take many forms suitable for indicating concentricity of the probe, optical sight or gage and the bore, as well as for recording the axial contour of the bore by suitable transducing and signal converting means.

I claim:

1. A device for aligning a gage with the axis of a bore comprising a carriage having four points of engagement adapted to move along one side of the internal cylindrical surface of the bore in directions parallel to the bore axis, a gage positioning unit mounted on the carriage for movement therewith and including two crossed stages for adjustment in crossed directions normal to the bore axis, means mounting the gage on one of the stages for rotation on an axis parallel to the bore axis, the gage being engageable with the bore surface as it is rotated for determining alignment of the gage axis with the bore axis.

2. A device according to claim 1 in which each point of engagement comprises spherical rollers.

3. A device according to claim 1 in which the gage positioning unit is mounted on one or more rods extending from the carriage toward the bore axis.

4. A device according to claim 3 in which the gage positioning unit is adjustable bodily along the rods to operate within bores of different diametrical size.

5. A device according to claim 1 in which one of said stages is mounted for movement along ways on the positioning unit and the other stage is mounted for movement along ways of the first mentioned stage substantially perpendicular to the first mentioned ways and carries the gage.

6. A device according to claim 5 in which each stage is movable on its associated ways by a micrometer type adjustment.

7. A device according to claim 6 in which the portion of the gage engageable with the bore surface is provided with indicia to indicate the amount of micrometer adjustment of the stages necessary to align the gage axis with the bore axis.

* * * * *